United States Patent
Johnson et al.

(10) Patent No.: US 7,586,869 B2
(45) Date of Patent: Sep. 8, 2009

(54) METHOD AND APPARATUS FOR TRACKING COSTS ASSOCIATED WITH PROPAGATING A DATA PACKET

(75) Inventors: Mark W. Johnson, Cedar Rapids, IA (US); Harold Thomas Hauer, Cedar Rapids, IA (US); Patrick D. McCusker, Center Point, IA (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 593 days.

(21) Appl. No.: 10/957,533

(22) Filed: Sep. 30, 2004

(65) Prior Publication Data

US 2006/0067316 A1    Mar. 30, 2006

(51) Int. Cl.
*H04W 4/00* (2009.01)

(52) U.S. Cl. .................. 370/328; 370/392; 455/406
(58) Field of Classification Search .................. None
See application file for complete search history.

(56) References Cited

U.S. PATENT DOCUMENTS

| | | | |
|---|---|---|---|
| 7,151,824 B1* | 12/2006 | Bingaman et al. | 379/114.22 |
| 2003/0054796 A1* | 3/2003 | Tamaki et al. | 455/406 |
| 2003/0208522 A1* | 11/2003 | McDonnell et al. | 709/201 |
| 2004/0203927 A1* | 10/2004 | Kraft | 455/456.2 |
| 2005/0197098 A1* | 9/2005 | Trossen | 455/406 |

\* cited by examiner

*Primary Examiner*—Jayanti K Patel
*Assistant Examiner*—Jung Park
(74) *Attorney, Agent, or Firm*—Daniel M. Barbieri

(57) ABSTRACT

Cost information is tracked for a data packet propagated through a node by receiving a data packet, creating a cost carrier descriptor and then forwarding the data packet to another node.

3 Claims, 12 Drawing Sheets

METHOD AND APPARATUS FOR TRACKING COSTS ASSOCIATED WITH PROPAGATING A DATA PACKET

BACKGROUND

Ad-hoc networking is becoming all the rage. We are somehow to believe that a collection of unorganized mobile nodes will be able to perpetuate a data packet irrespective of how an ad-hoc network is organized and maintained. It is well understood that a computer network needs to be managed in order to effectively use available resources when a data packet needs to be conveyed from a first node to a second node. Now, almost magically, ad-hoc networking purports to eliminate the need for high-level network management altogether.

When a data packet arrives at a stationary routing unit (e.g. a networking switch or router), the data packet is propagated according to a pre-established routing table. Included in a traditional routing unit is circuitry that uses the contents of the routing table to select one or more communications channels that will be used to propagate the data packet toward its final destination. In order to do this well, the routing table is built on pre-existing knowledge of a networks structure. For example, a first router will typically be connected to other routers, each of which is geographically disparate from the first router. The quality of a connection between the first router and the remaining routers is typically understood. Even when the quality of a connection varies over time, this time-varying connection can be reflected in the routing table by periodic updates to the contents of the routing table. As such, as the structure or quality of the connections between routers varies, so can the routing tables that the routers use to propagate a data packet.

As such, when a packet does arrive at a router, a portion of the destination address is used to select a particular entry in the router table. The selected entry is then used to direct the data packet to a particular communications channel. For example, when selected by a portion of the destination address, an entry in the routing table can cause the router to direct the data packet to a communications channel that connects a first router in Cleveland to a second router in Minneapolis. And, as the conditions of available channels changes over time, the same entry in the routing table can be modified in order to direct the data packet from Cleveland to St. Paul rather than to Minneapolis. What is important to note is that the communications channels are typically fixed from point-to-point and will only vary in the amount of data that each can carry over a particular time-varying quality profile. Even with all of this regularity, management of a data network is a complex and daunting task. So critical is the management of a network that many, many people devote their careers to the art of network management.

An ad-hoc network, on the other hand, is essentially impossible to manage because of the transient nature of individual connections between nodes. Just when a data packet can be directed to a particular neighbor node, the connection between a first node and its neighbor can be completely lost. Ad-hoc networking has simply not been able to solve this problem. That is why ad-hoc networking relies on the notion of discovering a neighbor node. Once a neighbor node is discovered, a data packet is blindly directed to the newly discovered neighbor node.

One of the problems with ad-hoc networking is that each node typically only has one communications channel that can be used to convey a data packet. There simply are not enough resources to intelligently route a data packet from a first mobile node to a newly discovered neighbor, especially when there are a plurality of mobile nodes within the communication range of the communication channel servicing the first mobile node.

In any type of networking structure, be it ad-hoc or fixed networks, there is even a more troublesome issue. Consider the situation where a data packet is propogated through any particular device in the network. For example, a data packet can be propagated through a fixed network by a switch, a router and various other network components. Up until now, it has always been assumed that the carrying costs for a connection are basically nil. That is because a data packet is routed through a fixed network is done so at no cost to the actual user. Generally, some large communications company has already made a fixed-capital investment by purchasing switches, routers and the cabling needed to string to whole network together. This type of large company is typically called a network operator. A network operator recoups its investment by charging for connections to the network (e.g. $19.95 per month). Of course, there are other contractual arrangements between the network operator and its customers that provide sufficient motivation for continued operation and expansion of the network by the network operator.

Ad-hoc networking changes the entire financial incentive strategy that has fueled continued expansion and upgrade of communications networks. In the situation where a slurry of ad-hoc nodes is to propagate a data packet, fixed networks will become more lightly loaded because of these additional routing resources (i.e. ad-hoc mobile networking nodes). At first blush, this appears to be a good thing because all of these additional resources will provide yet more bandwidth for today's communication driven society.

The problem with this simplistic view of the world it that there is simply no financial incentive for an ah-hoc network to participate in a data connection. Even more complex of an issue is the impact these mobile ad-hoc nodes will have on fixed installation networking systems and the financial models upon which network operators rely. If network traffic starts to use ad-hoc based connections, existing networking companies may not be able to demand higher connectivity prices from their customers. This, in turn, can have a devastating result for the networking infrastructure as a whole because network operators may not have the financial incentive to continue expansion and upgrade of their core communications competency.

SUMMARY

A method and apparatus for tracking carrying cost for a data packet propagated through a node by receiving a data packet, creating a cost carrier descriptor and then forwarding the data packet to another node.

BRIEF DESCRIPTION OF THE DRAWINGS

Several alternative embodiments will hereinafter be described in conjunction with the appended drawings and figures, wherein like numerals denote like elements, and in which.

DETAILED DESCRIPTION

Figure 1:
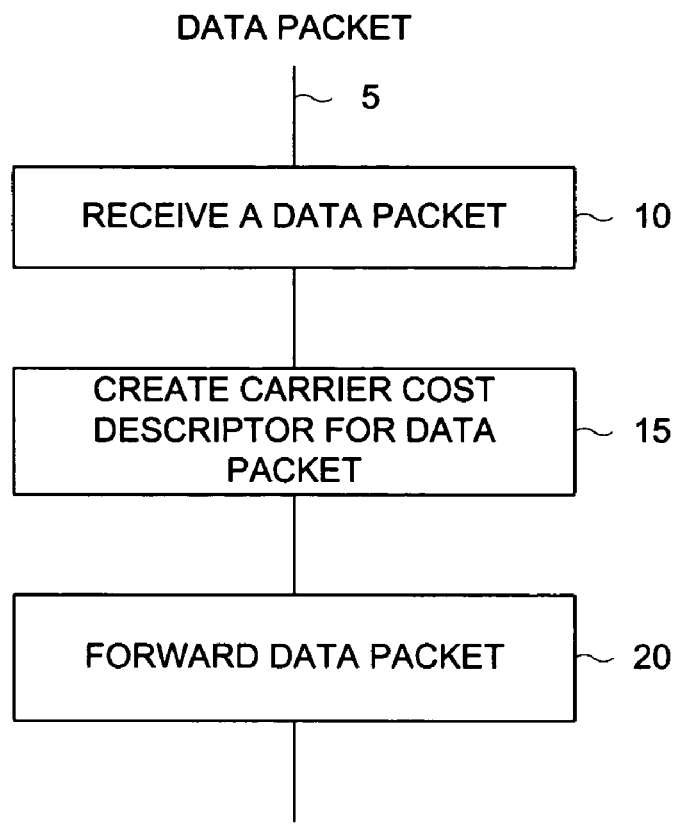
FIG. 1 is a flow diagram that depicts one illustrative method for tracking the cost associated with propagating a data packet.

FIG. 1 is a flow diagram that depicts one illustrative method for tracking the cost associated with propagating a data packet. As ad-hoc networking starts to take hold, there needs to be some form of incentive for an operator to participate in a network connection. Unless there is some form of financial incentive, there is little motivation to commit resources to the task of propagating a data packet in an ad-hoc manner. And, as communication network operators begin to experience less demand for their network services as a result of reduced network traffic resulting from the introduction of ad-hoc networking resources, network operators will be faced with a different financial operating model. Fixed networks will also need a mechanism for tracking their service costs.

According to this illustrative method a data packet is propagated by first receiving a data packet (step 10). Once a data packet is received, a carrier cost descriptor for the data packet is created (step 15). Typically, a carrier cost descriptor includes carrier information pertaining to the node receiving the data packet. According to one alternative variation of the present method, carrier information is obtained from an external source. In yet another variation of the present method, carrier information is derived from within the node itself. The carrier cost descriptor can be utilized in applications where the owner or operator of a node participating in a network connection can be compensated for services rendered, i.e. for propagating a data packet. The received data packet is also forwarded (step 20) to its intended destination.

Figure 2:
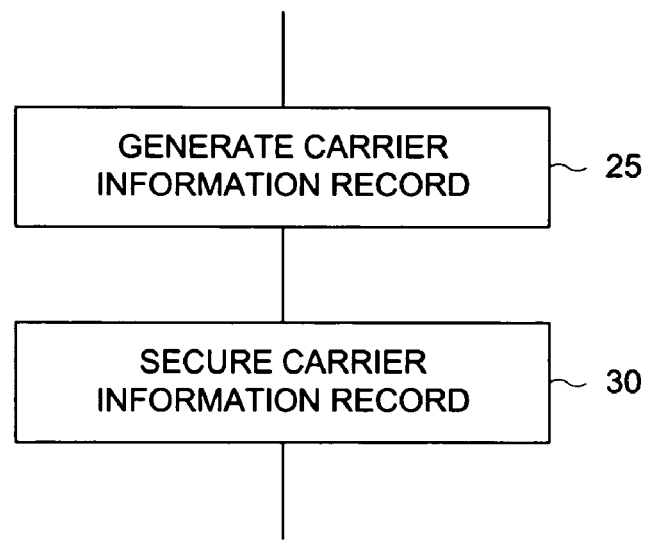
FIG. 2 is a flow diagram that depicts one alternative illustrative method for creating a secured carrier cost descriptor.

FIG. 2 is a flow diagram that depicts one alternative illustrative method for creating a secured carrier cost descriptor. According to this alternative method, a carrier cost descriptor is created by generating a carrier information record (step 25). The carrier information record comprises one or more pieces of information that are useful in calculating the cost of carrier operation. Once the carrier information record has been thus assembled, it is then secured (step 30). According to one illustrative method, a carrier information record is secured by way of encryption. This is useful in applications where the carrier information record contains proprietary information and should not be divulged to other receiving nodes. It should be appreciated that a carrier information record can be secured in a wide variety of distinctive procedures and the claims appended hereto are not intended to be limited to any example securing method described herein.

Figure 3:
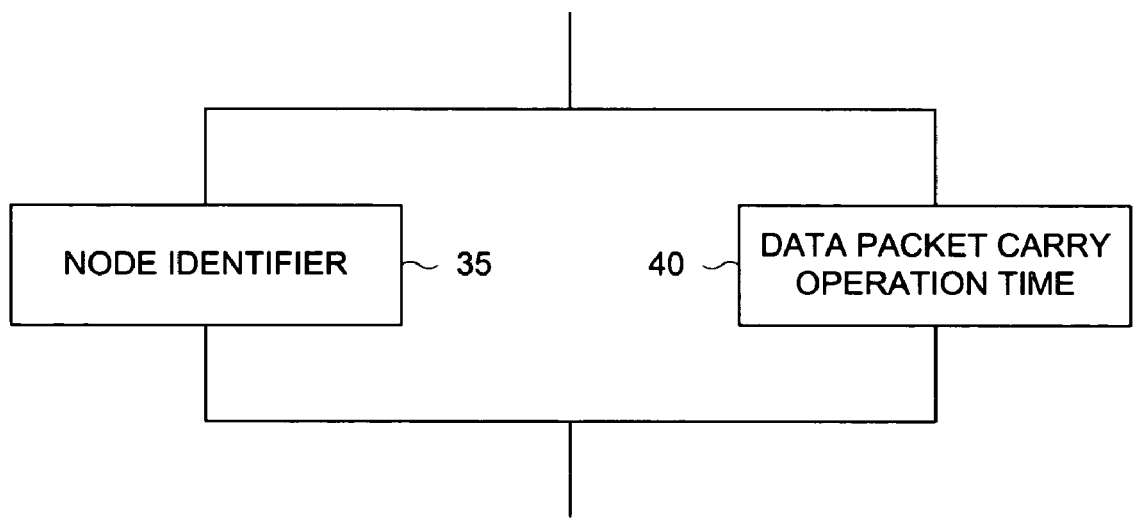
FIG. 3 is a flow diagram that depicts one alternative illustrative method for generating a carrier information record in a fixed node

FIG. 3 is a flow diagram that depicts one alternative illustrative method for generating a carrier information record in a fixed node. According to this alternative method, a carrier information record is generated from at least one of a node identifier (step 35) and a time for a data packet carrying operation (step 40). Typically, a node is identified by a node identifier that may take the form of a string of alphanumeric characters. According to one variation of the present illustrative method, a data packet carrying operation time comprises the time at which a data packet is processed by a node. In yet another variation of the present method, the time for a data packet carrying operation comprises a representation of the amount of time or other resources used expended in processing a data packet in a node. According to one variation of the present method, the node identifier is obtained from an external source. According to yet another variation of the present method, the node identifier is determined within the node itself. For example, in the case of a fixed node application of the present method, a node identifier can comprise a station name which is programmed into a working register in the node itself. According to yet another variation of the present method, the data packet carrying operation time is determined by means of a timer included in the node. As such, the arrival and departure times of a data packet are tagged using the timer and a processing time is determined by the difference in the arrival and departure times for a data packet. In yet another variation of the present method, the data packet carrying operation time is determined by a time-tag that represents the time of day that the data packet was processed by a node. In yet another variation of the present method, the data packet carrying operation time is determined by determining the resources used in processing a data packet. For example, it may be important in determining a billing amount that a data packet was directed to a high-cost satellite-based communications channel. On the other extreme, it may be equally important to know that a data packet was conveyed to a next node using an ad-hoc communications channel (e.g. an 802.11 type of wireless network).

Figure 4:
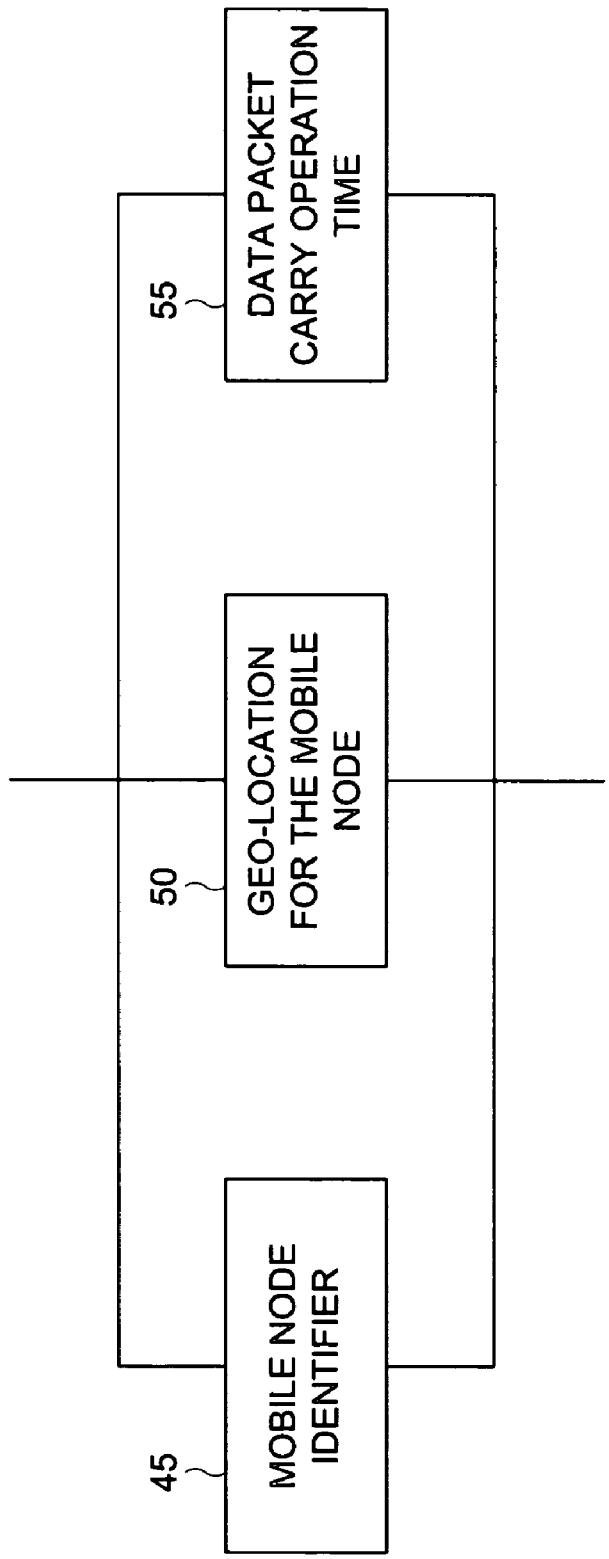
FIG. 4 is a flow diagram that depicts one alternative illustrative method for generating a carrier information record in a mobile node.

FIG. 4 is a flow diagram that depicts one alternative illustrative method for generating a carrier information record in a mobile node. According to this alternative method, a carrier information record is generated from at least one of a mobile node identifier (step 45), a geo-location for the mobile node (step 50), and a time for a data packet carrying operation (step 55). In addition to the carrier information record associated with a stationary node, as described above, a mobile node further comprises a geo-location pertaining to its geographic location with respect to a reference. According to one variation of the present method a geo-location is determined by processing a plurality of positioning signals, for example signals received from global positioning satellites. In this situation, the mobile node is likely to include some form of geo-positioning equipment (e.g. a GPS receiver). According to yet another variation of the present method, a geo-location is received from an external source. For example, a geo-positioning system may be available in a vehicle in which the node is mounted. In such case, an interface between the node propagating device and the geo-location system can be used to obtain a current geo-location for a mobile node. According to this alternative method, the mobile node receives and transmits an incoming data packet and further assembles a carrier information record which contains at least one of its mobile node identifier, geo-location, and data packet carrying operation time. It should be appreciated that the data packet carrying time is determined according to any one of the techniques heretofore described.

Figure 5:
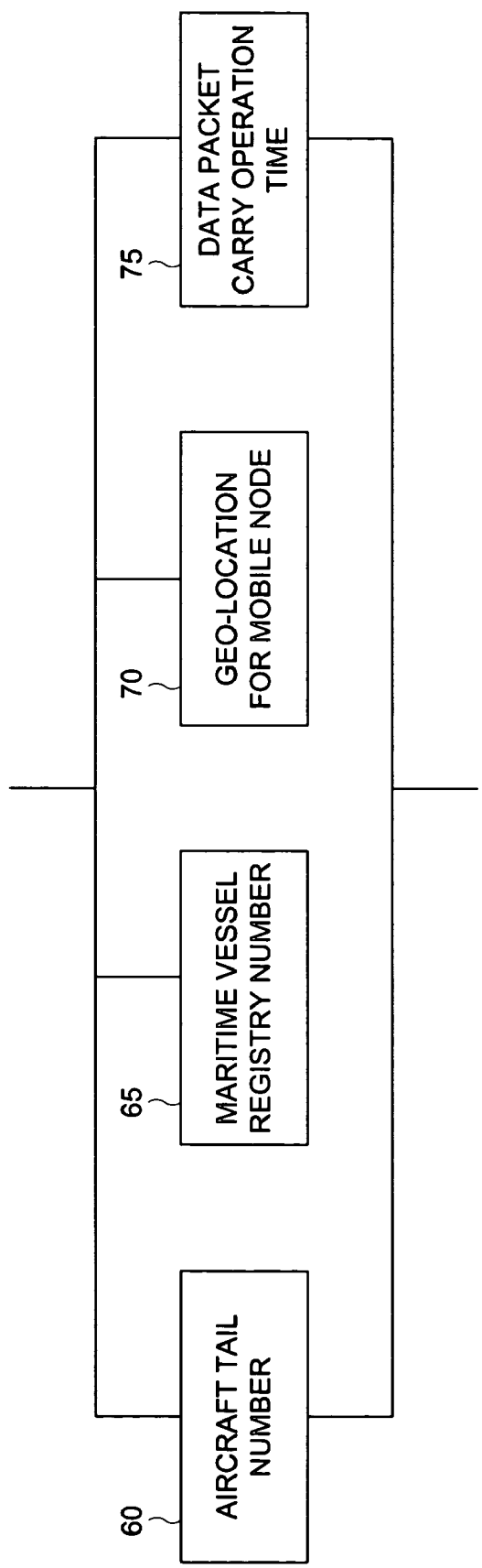
FIG. 5 is a flow diagram that depicts one alternative illustrative method for generating a carrier information record for a mobile node operating on a non-constrained platform.

FIG. 5 is a flow diagram that depicts one alternative illustrative method for generating a carrier information record for a mobile node operating on a non-constrained platform. According to one illustrative use case the present method can be applied to a mobile node operating aboard an aircraft. According to yet another illustrative use case, the present method can be applied to a mobile node operating aboard a maritime vessel. An aircraft is typically identified by a "tail number" and a maritime vessel is identified by its maritime vessel registry number. According to this illustrative method, a carrier information record is generated from at least one of an aircraft tail number (step 60), a maritime vessel registry number (step 65), a geo-location for the mobile node (step 70), and a time for a data packet carrying operation (step 75). According to one variation of the present method, an aircraft tail number is determined by obtaining the tail number from a device external to a device for propagating a data packet in accordance with the teachings herein. In another variation of the present method, a tail number is programmed into a device for propagating a data packet, e.g. when the device is installed in an aircraft. According to one variation of the present method, a vessel registry number is determined by obtaining the vessel registry number from a device external to a device for propagating a data packet in accordance with the teachings herein. In another variation of the present method, a vessel registry number is programmed into a device for propagating a data packet, e.g. when the device is installed in a ship. The carrier cost descriptor generated according to these variations of the present method can be utilized to compensate the aircraft node or the vessel node for their participation in the network.

Figure 6:
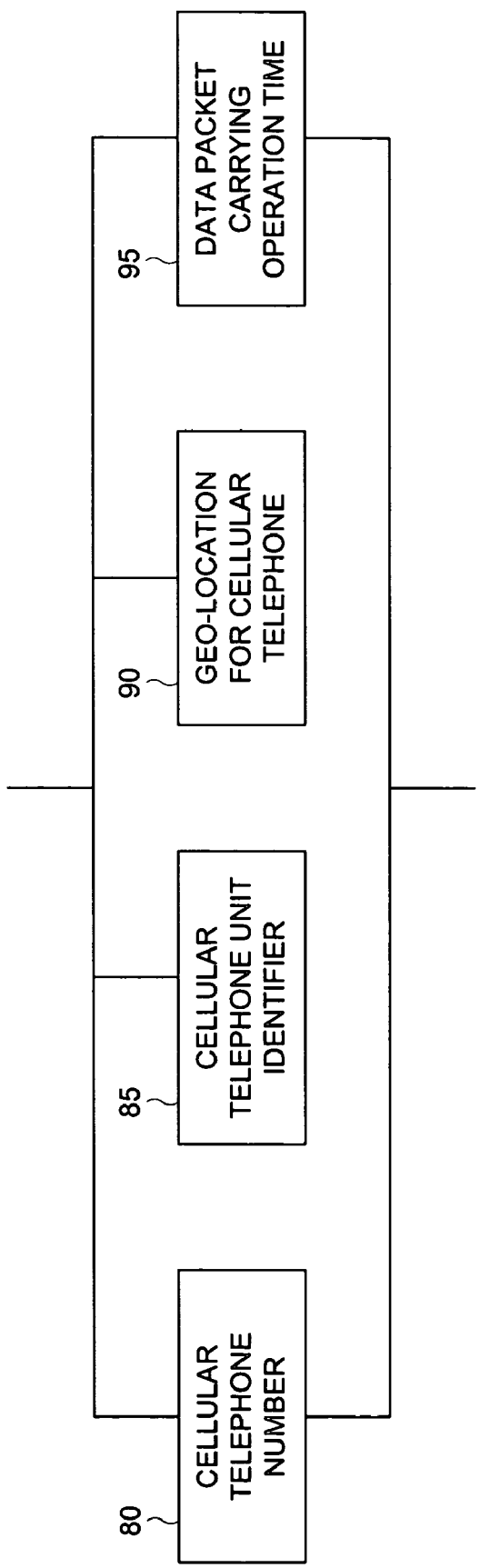
FIG. 6 is a flow diagram that depicts one alternative illustrative method for generating a carrier information record in a hand-held device.

FIG. 6 is a flow diagram that depicts one alternative illustrative method for generating a carrier information record in a hand-held device. It should be appreciated that a hand-held device includes, but is not limited to a cellular telephone, a personal digital assistant, a notebook computer and various other device types. It is contemplated that the claims appended hereto are to read upon any portable device that includes a wireless data network. Different types of portable hand-held devices will be identified in different ways. For example, a cellular phone is typically identified by at least one of a telephone number, a unique unit identifier (e.g. a serial number) and a user account number. In the case of a personal digital assistant or other similar device, a user can be asked to enter an account number. For example, a user can enter a credit card number, a participant code that can be used to uniquely identify the owner of the device, a serial number for the device, a media access controller address and numerous other forms of identification. According to this illustrative method, a carrier information record is generated from at least one of a cellular telephone number (step 80), a cellular telephone unit identifier (step 85), a cellular customer account number (step 86), a user identifier (step 87), a geo-location (step 90) for the hand-held device, and a time for a data packet carrying operation (step 95). It should be appreciated that various types of hand held devices will have various forms of wireless communications channels and the claims appended hereto are not intended to be limited in scope to any particular form of wireless communications channel that a hand held device uses to propagate a data packet. For example, any suitable wireless communications channel, including, but not limited to 802.11, BlueTooth, G2, G2.5 and G3 wireless networks can all be utilized in conjunction with the present method. Again, these examples of wireless communications channels are presented in order to illustrate the application of the present method and are not intended to limit the scope of the claims appended hereto.

Figure 7:
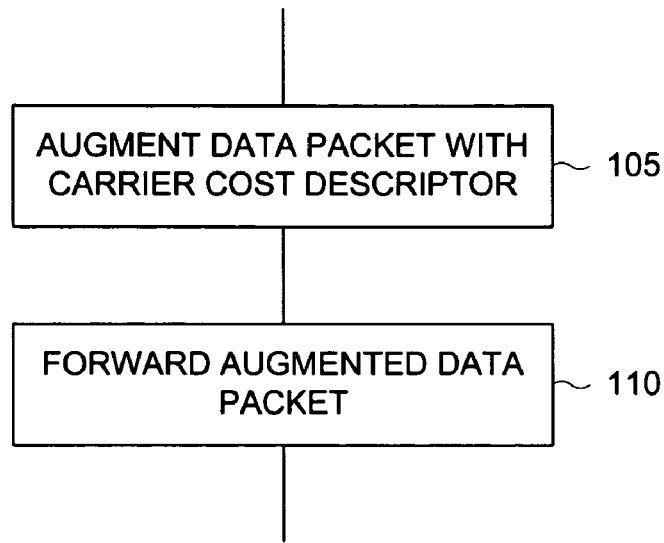
FIG. 7 is a flow diagram that depicts one alternative illustrative method for conveying carrier cost information along with a forwarded data packet.

FIG. 7 is a flow diagram that depicts one alternative illustrative method for conveying carrier cost information along with a forwarded data packet. In some applications, it is desirable to transmit the carrier cost descriptor along with a received data packet. As a data packet moves through successive nodes, each node will have an opportunity to append its own carrier cost information to a data packet. In this manner, the total carrying charges for a data packet can be determined once the data packet is prepared to delivery to a destination node or when it is handed off to a different carrier. For example, where a data packet migrates from an ad-hoc environment to a fixed networking environment, the present method can be utilized in order to determine carrying charges for a complete or partial portion of the path traveled by the data packet. According to this alternative illustrative method, a received data packet is first augmented with a carrier cost descriptor (step 105) and the augmented data packet is transmitted toward its intended destination (step 110). Augmentation of the data packet may simply comprise appending the data packet with the carrier cost descriptor and then transmitting it to its intended destination. It should be appreciated that other schemes for forwarding a data packet can be devised and the claims appended hereto are not intended to be limited to any example forwarding method described herein.

Figure 8:
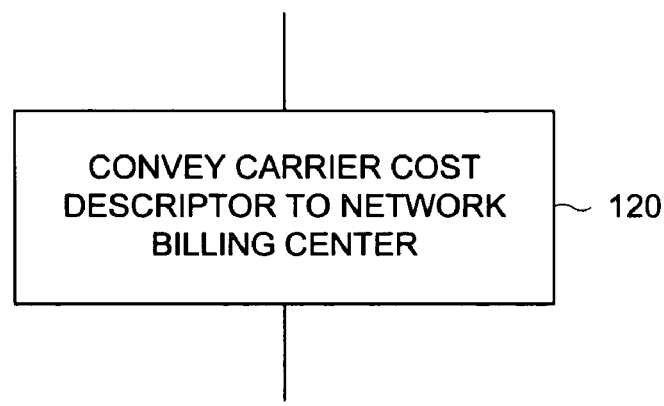
FIG. 8 is a flow diagram that depicts one alternative illustrative method for conveying the carrier cost descriptor to a network billing center.

FIG. 8 is a flow diagram that depicts one alternative illustrative method for conveying the carrier cost descriptor to a network billing center. In some applications, it is desirable to convey the carrier cost descriptor directly to a network billing center (step 120). According to one variation of the present method, the carrier cost descriptor is directed to a network billing center substantially contemporaneously with the processing of a data packet. According to yet another variation of the present method, the carrier cost descriptor is stored and subsequently directed to a network billing center. This variation of the present method can be used in a batch mode so that a plurality of carrier cost descriptor can be accumulated over time and conveyed to a network billing center in such a batch mode.

Figure 9:
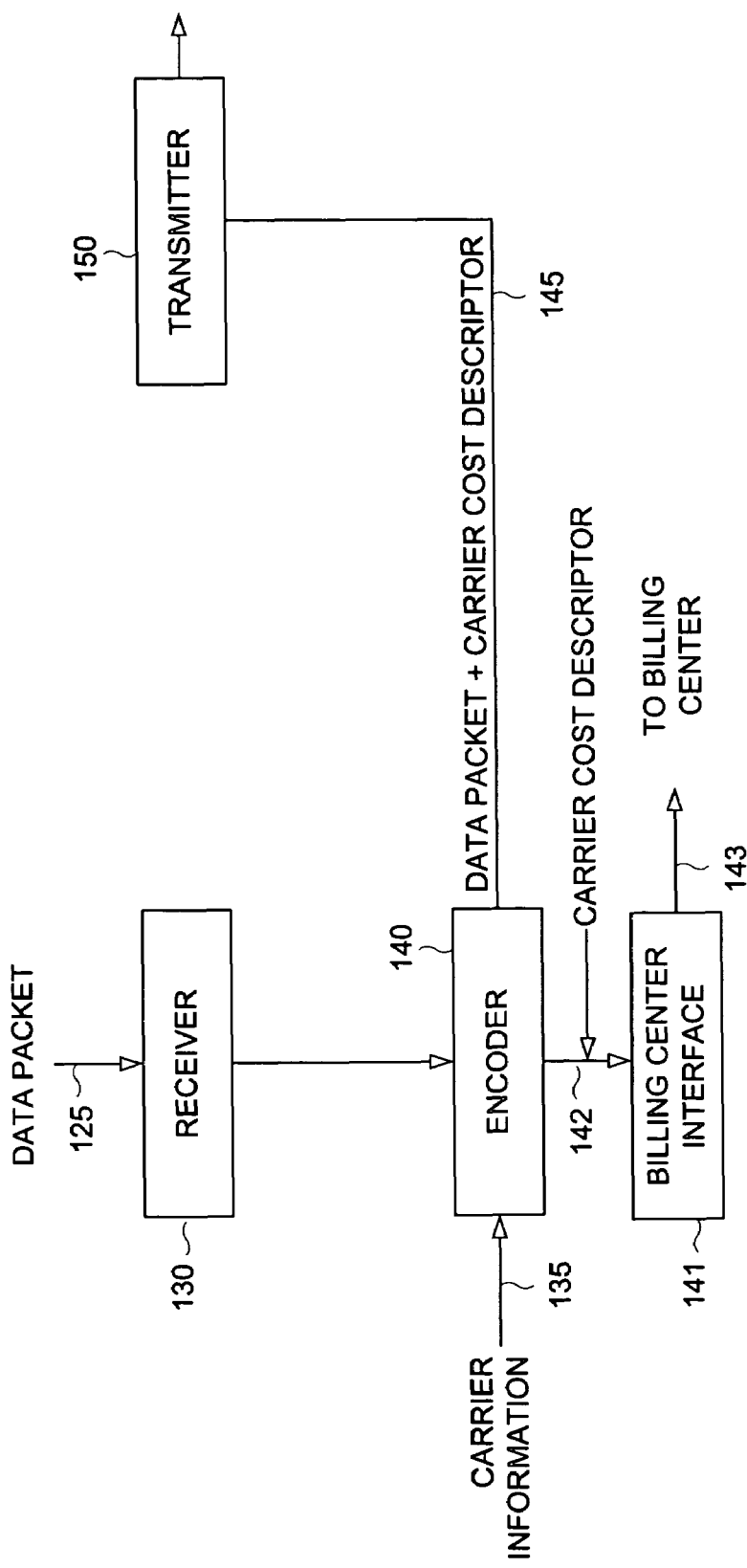
FIG. 9 is a block diagram that depicts one example embodiment of a data forwarding apparatus.

FIG. 9 is a block diagram that depicts one example embodiment of a data forwarding apparatus. According to this example embodiment, the data forwarding apparatus comprises a receiver 130, an encoder 140, and a transmitter 150. The receiver 130 receives a data packet 125 and provides it to the encoder 140 and to the transmitter 150. The encoder creates a carrier cost descriptor for the data packet 125 according to carrier information 135.

According to one alternative example embodiment, the encoder augments the data packet with the carrier cost descriptor and directs the data packet and the carrier cost descriptor to the transmitter 150. The transmitter 150 then propagates the data packet along with the carrier cost descriptor to another node. It should be appreciated that the encoder 140 will augment its own carrier cost descriptor to a received data packet and that such received data packet may have a carrier cost descriptor attached thereto by an node that previously propagated the data packet.

According to another example embodiment, the apparatus further comprises a billing center interface 141. The billing center interface 141 receives a carrier cost descriptor 142 from the encoder 140 and conveys it to a network billing center 143. When the billing center 143 receives the carrier cost descriptor, it can perform financial incentive tasks by billing customers for data carrying services and paying participants for such carrying services according to a received carrier cost descriptor. It should be appreciated that, according to one alternative embodiment, the billing center interface 141 includes a buffer that stores a plurality of carrier cost descriptors, which can by virtue of the buffer, be accumulated over time. The contents of the buffer, according to this alternative embodiment, are conveyed to network billing center 143 in a batch mode.

Figure 10:
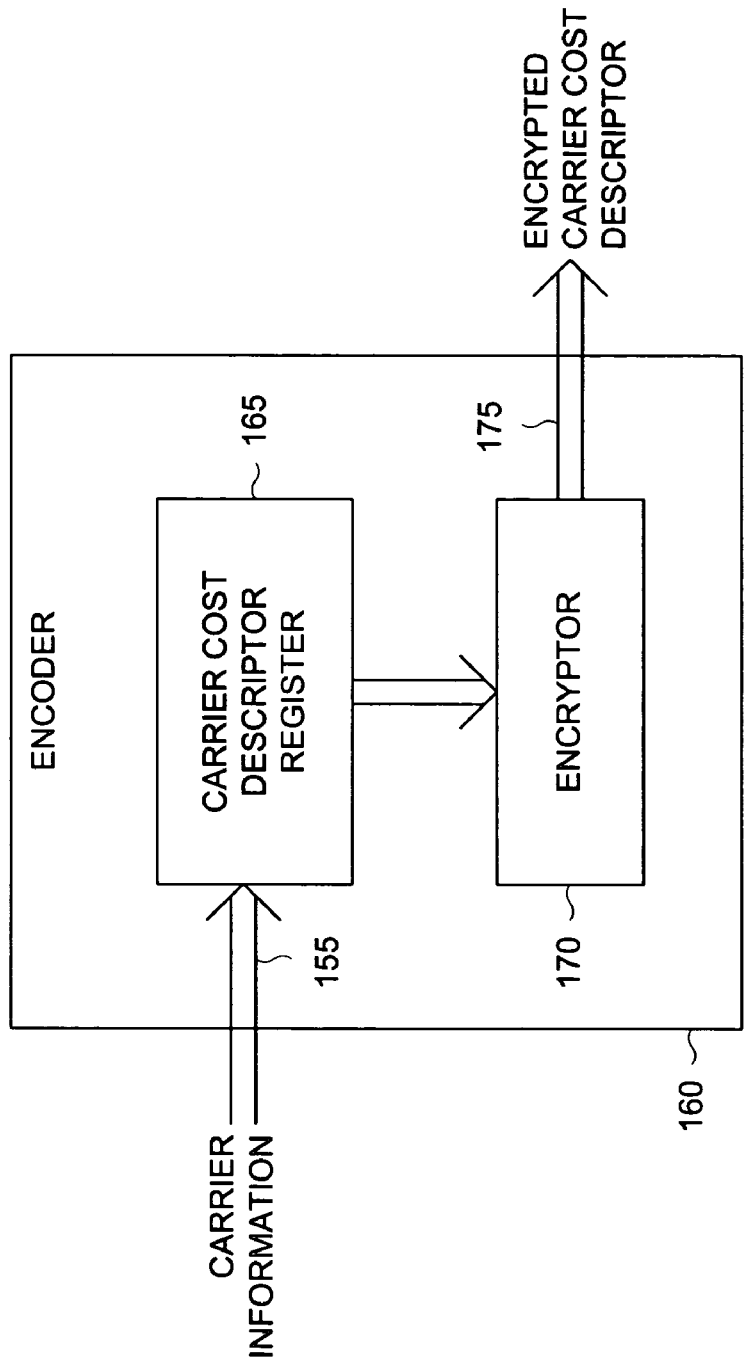
FIG. 10 is a block diagram that depicts one example embodiment of a secure encoder.

FIG. 10 is a block diagram that depicts one example embodiment of a secure encoder. According to this example embodiment, the encoder 160 comprises a carrier cost descriptor register 165 that stores a received carrier information 155. When a data packet arrives, the encoder 160 receives carrier information 155 according to the techniques and teachings of the present method. According to this example embodiment, the encoder 160 further comprises an encryptor 170 receives the carrier information from the carrier cost descriptor register 165 and encrypts the carrier cost descriptor in order to form a secure version thereof. The secure version of the carrier cost descriptor is directed to the transmitter as an augmentation to a data packet according to one example alternative embodiment. According to yet another example embodiment, the secure version of the carrier cost descriptor is directed to the billing center interface 141 for direct conveyance to a billing center 143.

Figure 11:
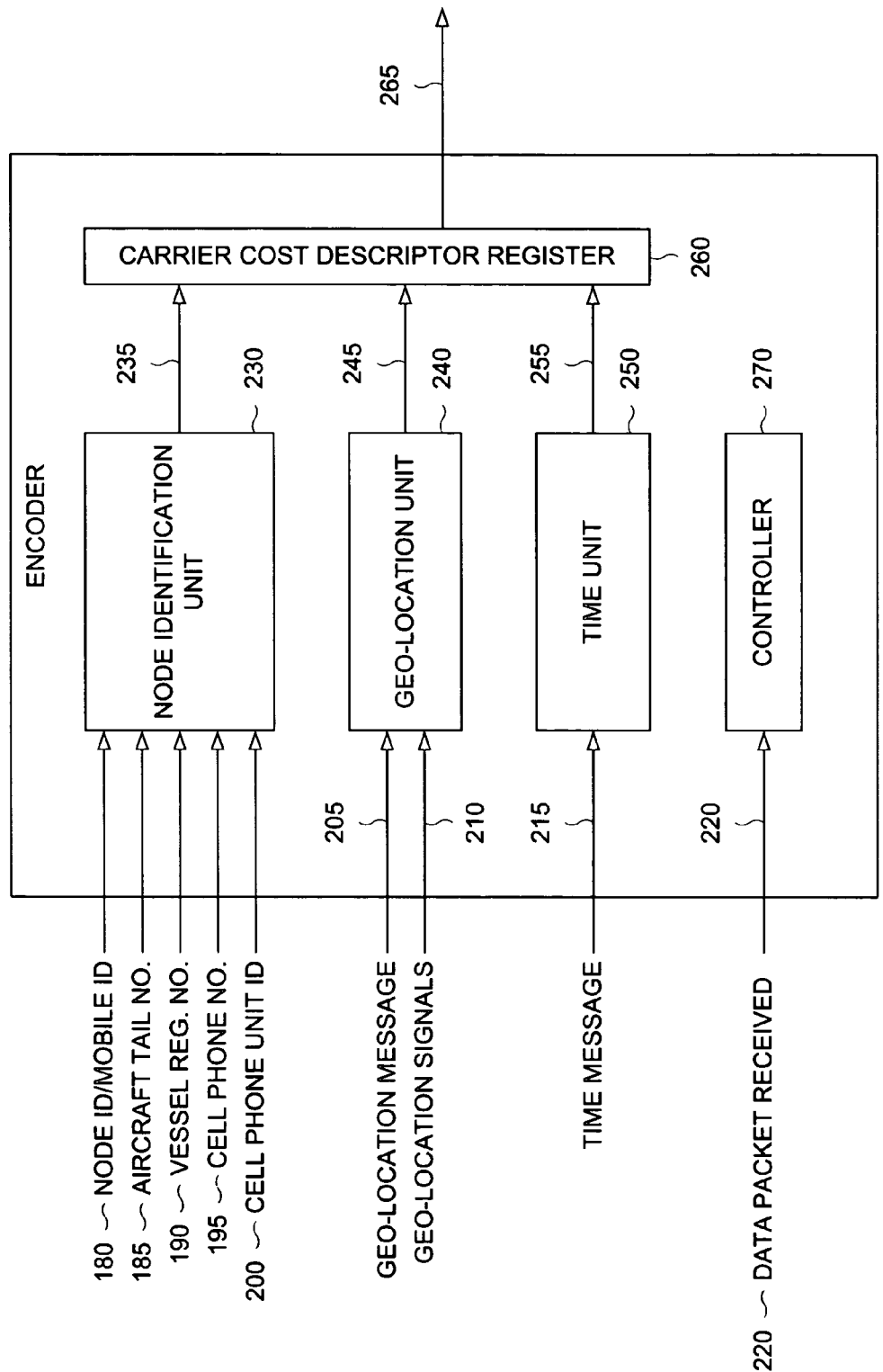
FIG. 11 is a block diagram that depicts several alternative example embodiment of an encoder.

FIG. 11 is a block diagram that depicts several alternative example embodiment of an encoder. According to this example embodiment, the encoder 225 comprises a node identifier unit 230. According to one alternative embodiment, the node identifier unit 230 comprises an input port. The node identifier unit 230 receives at least one of a node identifier 180, a mobile node identifier 180, an aircraft tail number 185, a maritime vessel registry number 190, a cellular telephone number 195, and a cellular telephone unit identifier 195, and a hand-held device user identification. Any one or more of these are stored in a node identifier field of a carrier cost descriptor register 260 included in this alternative embodiment of an encoder.

According to this yet another example embodiment, the encoder 225 further comprises a geo-location unit 245. The geo-location unit 240 of one alternative embodiment comprises an input port for receiving geo-position location messages from an external device (e.g. from a GPS receiver). According to yet another alternative embodiment, the geo-location unit comprises a positioning receiver (e.g. a GPS receiver). In this case, the geo-location unit 240 determines a geo-location by processing positioning signals that it receives. One example of the type of geo-positioning signals that a typical geo-location unit 240 can process includes GPS signals received from a satellite. The geo-location unit 240 stores a geo-location in a geo-location field included in the carrier cost descriptor register 260. The present embodiment is only illustrative and the claims appended hereto are not intended to be limited to any particular form of positioning receiver herein described.

According to yet another example embodiment, the encoder 225 further comprises a time unit 250. According to one alternative embodiment, the time unit 215 receives a data packet arrival notification 215 from the receiver. In response, the time unit stores a time-of-day indicator in a time field included in the carrier cost descriptor register 260.

Figure 12:
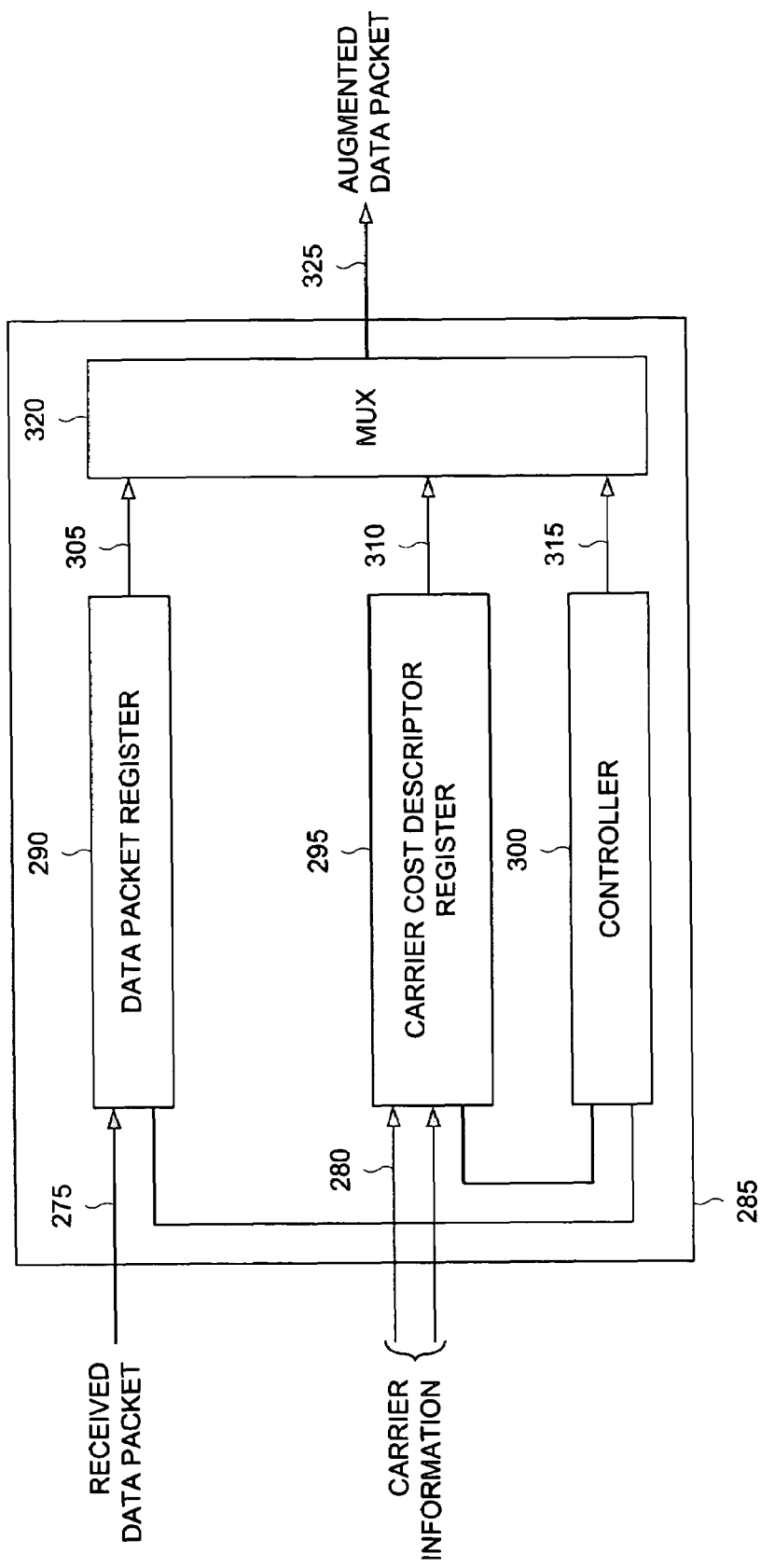
FIG. 12 is a block diagram that depicts one alternative example embodiment of an encoder that augments a data packet with a carrier cost descriptor.

FIG. 12 is a block diagram that depicts one alternative example embodiment of an encoder that augments a data packet with a carrier cost descriptor. According to this example embodiment, the encoder 285 comprises a data packet register 290 that stores a received data packet 275, a carrier cost descriptor register 295 that is used to store a carrier information 280, a multiplexer 320 structured to select an output from the data packet register 290 and an output from the carrier cost descriptor register 295 and capable of outputting an augmented data packet 325 in the form of a stored data packet and a stored carrier information record. Accordingly, a controller 300 causes the contents of the data packet register and the contents of the carrier cost descriptor register 295 to be successively directed to the transmitter 150.

Figure 13:
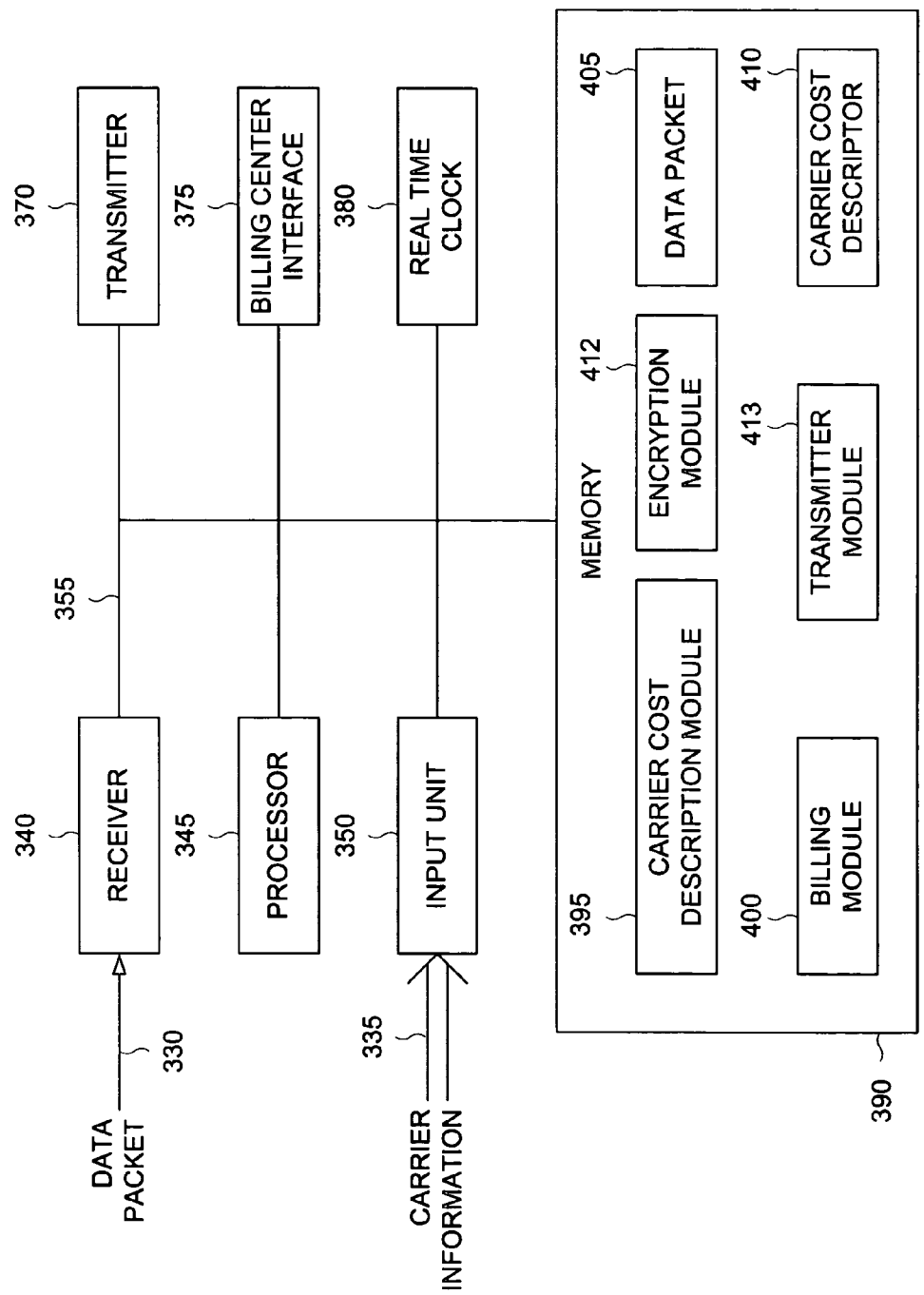
FIG. 13 is a block diagram that depicts one example embodiment of a data forwarding apparatus.

FIG. 13 is a block diagram that depicts one example embodiment of a data forwarding apparatus. According to this example embodiment, the data forwarding apparatus comprises a receiver 340, a processor 345, a transmitter 370, and a memory 390. The receiver 340 is capable of receiving a data packet 330 and providing it to the processor 345 and transmitter 370. When a data packet 330 arrives, the receiver 340 receives the data packet and makes it available to the processor 345 via a data bus 355. The processor 345 executes a carrier cost descriptor module 395, included in the present embodiment and stored in memory 390, which when executed by the processor 345, minimally causes the processor to create a carrier cost descriptor 410 and store it in the memory 390. The carrier cost descriptor 410 can be utilized in applications where a participating node in a network seeks to be compensated for its participation.

According to this example embodiment, the data forwarding apparatus further comprises an input unit 350 which is capable of receiving carrier information 335 and making it available to the processor via data bus 355. According to yet another alternative embodiment, the apparatus further comprises a real time clock 380 which is capable of making real time available to the processor 345 by means of the bus 355. According to yet another alternative embodiment, the apparatus further comprises a billing center interface 375. Included in yet another alternative embodiment is an encryption module 412 that is stored in the memory 390. Another example embodiment includes a billing module 400 that is also stored in the memory 390.

According to this example embodiment, the carrier information record includes at least one of a node identifier, a mobile node identifier, an aircraft tail number, a maritime vessel registry number, a cellular telephone number, a cellular telephone unit identifier, a geo-location for the mobile node, and a time for a data packet carrying operation. Such carrier information records can be obtained from within the apparatus or received from an external source.

According to this example embodiment, the memory 390 further comprises a transmitter module 413 that when executed by the processor 345, minimally causes the processor to augment the data packet 405 with carrier cost descriptor 410 and forward the augmented data packet via transmitter 370. According to one variation of the present embodiment, when transmitter module 413 is executed by the processor, the data packet 405 is appended with carrier cost descriptor 410 and transmitted to its intended destination via transmitter 370.

Figure 14:
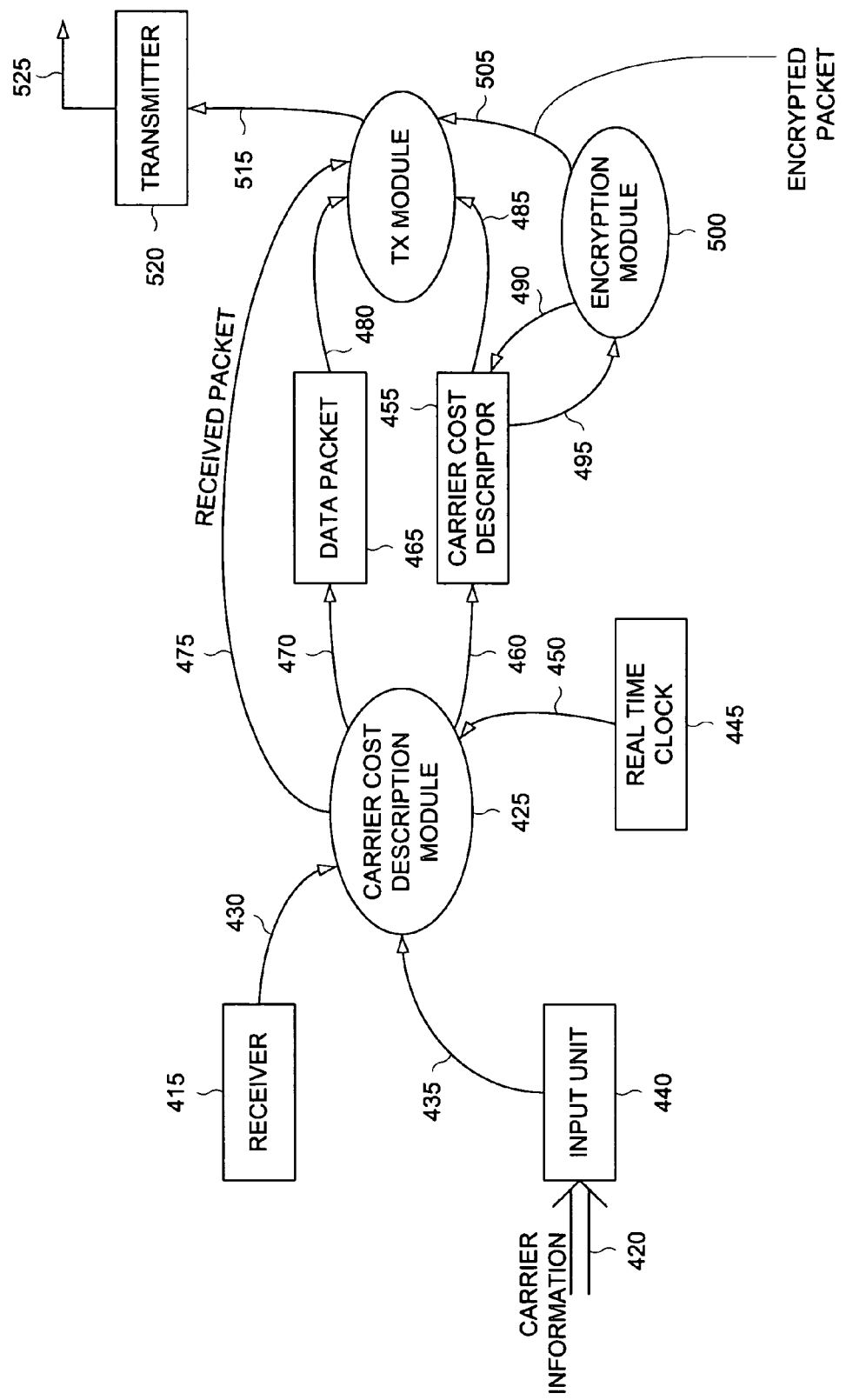
FIG. 14 is a data flow diagram that depicts the internal operation of one example embodiment of a data forwarding apparatus.

FIG. 14 is a data flow diagram that depicts the internal operation of one example embodiment of a data forwarding apparatus. According to this example embodiment, when a data packet is received by the receiver 415, the processor executes a carrier cost descriptor module 425. The processor is further minimally caused to store 470 the data packet in memory 465. Upon execution, the processor is minimally caused to access the input unit 440 to obtain 435 a carrier information record 420. In one variation of the present embodiment, the input unit 440 holds the carrier information record prior to processor access, and in another variation, the processor enables the input unit 440 to collect a carrier information record and provide it to the processor. Carrier information records can be obtained from within the apparatus or received from an external source. Carrier information record includes at least one of a node identifier, a mobile node identifier, an aircraft tail number, a maritime vessel registry number, a cellular telephone number, a cellular telephone unit identifier, a geo-location for the mobile node, and a time for a data packet carrying operation. When the processor receives the carrier information record, it creates a carrier cost descriptor 455 and stores it in the memory. When the receiver 415 receives a data packet, transmitter 520 is enabled to transmit the data packet, made available to it by the receiver 415, to its intended destination.

According to one alternative example embodiment, when a carrier cost descriptor 455 is created, the processor executes an encryption module 500 which minimally causes it to encrypt the carrier cost descriptor 455. In one variation of the present embodiment, the encrypted carrier cost descriptor 505 is stored in the memory. In another variation of the present embodiment, the encrypted carrier cost descriptor 505 is made available to transmitter 525 along with a received data packet as described below.

According to one alternative example embodiment, when a carrier cost descriptor 455 is created, the processor executes a transmitter module 510 which minimally causes it to retrieve data packet 465 and carrier cost descriptor 455 via lines 480 and 485, respectively, augment the data packet with the carrier cost descriptor, and make available the augmented data packet on line 515 to transmitter 520. In one variation of the present embodiment, a data packet is augmented by appending a carrier cost descriptor to a received data packet.

According to one alternative example embodiment, when a carrier cost descriptor 455 is created, the processor executes a billing module 400 which minimally causes the processor to retrieve the carrier cost descriptor 455 on line 401 and direct it to the billing center interface 375. The billing center interface 375 is capable of conveying the carrier cost descriptor 455 to a network billing center.

While the present method and apparatus has been described in terms of several alternative and exemplary embodiments, it is contemplated that alternatives, modifications, permutations, and equivalents thereof will become apparent to those skilled in the art upon a reading of the specification and study of the drawings. It is therefore intended that the true spirit and scope of the appended claims include all such alternatives, modifications, permutations, and equivalents.

What is claimed is:

1. A method for tracking the cost of propagating a data packet through a node comprising:
   receiving a data packet;
   creating a carrier cost descriptor for the data packet, comprising:
   generating a carrier information record that includes at least a mobile telephone unit identifier, a GPS receiver determined geo-location for the mobile telephone and a time for a data packet carrying operation securing the carrier information record;
   and forwarding the data packet;
   wherein the carrier cost descriptor is representative of a propagation cost existing after said step of receiving a data packet and before a subsequent receipt of said data packet occurring after said step of forwarding the data packet.

2. A data forwarding apparatus comprising:
   receiver capable of receiving a data packet;
   encoder capable of creating a carrier cost descriptor for the data packet;
   transmitter capable of forwarding the data packet;
   a carrier cost descriptor register capable of storing a carrier information record and an encryptor capable of outputting an encrypted carrier cost descriptor according to the stored carrier information record;
   wherein the encoder further comprises a GPS geo-location unit capable of determining a mobile node geo-location; and
   storing the mobile geo-location in a geo-location field of the carrier cost descriptor register.

3. A data forwarding apparatus comprising:
   receiver capable of receiving a data packet;
   processor capable of executing an instruction sequence;
   memory capable of storing one or more instruction sequences;
   transmitter capable of forwarding the data packet;
   an instruction sequence stored in the memory including:
   carrier cost descriptor module that, when executed by the processor, minimally causes the processor to:
   create a carrier cost descriptor for the data packet;
   wherein the carrier cost descriptor comprises a carrier information record, and the memory further comprises an encryption module that, when executed by the processor, minimally causes the processor to:
   encrypt the carrier information record;
   wherein the carrier information record includes a mobile node identifier, a GPS geo-location for the mobile node and a time for a data packet carrying operation.

* * * * *